United States Patent Office 3,424,706
Patented Jan. 28, 1969

3,424,706
VINYLIDENE CHLORIDE COPOLYMERIZATION IN PRESENCE OF PREFORMED SEED LATEX
David R. Smith and Howard Peterson, Decatur, Ill., assignors to A. E. Staley Manufacturing Company, Decatur, Ill., a corporation of Delaware
No Drawing. Filed July 8, 1966, Ser. No. 563,703
U.S. Cl. 260—29.6
Int. Cl. C08f 1/13, 29/22
10 Claims

ABSTRACT OF THE DISCLOSURE

Preparation of polydisperse polyvinylidene chloride latex comprising the steps of (1) initiating the polymerization of vinylidene chloride under emulsion polymerization conditions, preferably in the presence of particles of preformed addition polymer in latex form having an average diameter less than the average diameter of the ultimate polydisperse polyvinylidene chloride polymer, (2) after the vinylidene chloride polymerization becomes exothermic, adding particles of preformed addition polymer in latex form having an average diameter less than the average diameter of the ultimate polydisperse vinylidene chloride polymer, said polydisperse polyvinylidene chloride latex being suitable for coating paper, metals, plastics, etc.

---

This invention relates to the preparation of polydisperse polyvinylidene chloride latex. More particularly this invention relates to the preparation of stable, high solids, low viscosity, polydisperse polyvinylidene chloride latex which comprises the steps of (1) initiating the polymerization of vinylidene chloride under emulsion polymerization conditions, preferably in the presence of particles of a preformed addition polymer in latex form having an average diameter less than the average diameter of the ultimate polydisperse vinylidene chloride polymer, (2) after the vinylidene chloride polymerization becomes exothermic, adding particles of preformed addition polymer in latex form having an average diameter less than the average diameter of the ultimate polydisperse vinylidene chloride polymer.

Polyvinylidene chloride polymers have been found suitable for coating paper, metals, plastics, etc. since these polymers form protective coatings which are tough, inert to a large number of chemicals, such as water, acids, oils and fats, and relatively impermeable to many gases. In general, it is preferred to apply the polyvinylidene chloride to the substrate in the form of a latex rather than from an organic solvent solution. In this way, one can avoid the use of expensive organic solvents, which are frequently inflammable or toxic.

It is generally considered that a polyvinylidene chloride latex should be applicable to a substrate at high total solids in order to minimize the amount of water that has to be removed from the substrate and the drying time. See for example, British Patent 1,007,050, British Patent 1,011,500, U.S. Patent 2,894,927, etc. Inasmuch as most high speed coating operations require the use of low viscosity coating compositions, the polyvinylidene chloride latex should have a relatively low viscosity at the indicated high solids concentration and be stable under the coating conditions. This brings into play a number of interdependent factors, which require that the polyvinylidene chloride latex be prepared under carefully controlled conditions. As the polyvinylidene chloride polymer solids increase, the viscosity of the latex tends to increase and the stability of the latex decreases (i.e. the tendency for the latex to coagulate increases). The emulsion stability can be improved by increasing the concentration of emulsifier used to prepare the latex polymer. However, the higher the concentration of emulsifier used to prepare the polyvinylidene chloride latex, the higher the concentration of polyvinylidene chloride particles in the emulsion and the smaller the particle size. See Canadian Patent 733,207. At high solids, the viscosity of a polyvinylidene chloride latex increases as number of polymer particles increases and/or as their size decreases. Further, as the emulsifier concentration increases, the water resistance and moisture vapor transmission resistance of the latex deposit decreases.

It is also generally considered that a polyvinylidene chloride latex should have a relatively small particle size, less than about 0.3 microns, preferably no more than about 0.2 microns, in order to coalesce properly when deposited on a substrate. In order to keep polyvinylidene latex from forming a hazy coating, the aforementioned British Patents indicate that it is desirable to employ polyvinylidene chloride latex having a wider particle size distribution than that which can be obtained by the polymerization process described in the 1,011,500 patent. These patentees state that the polymerization process described in the 1,011,500 patent produces only emulsions having a particle size range of about 0.04 microns and that this drawback is overcome by blending two batches of polyvinylidene chloride latex, each with a different size. We believe that a polydisperse system of this type levels better and coalesces more readily when applied to a substrate.

The polymerization process described in British Patent 1,011,500, like most prior art processes for the production of polyvinylidene chloride latex, whether of a batch type or continuous-monomer-addition type form essentially all the polymer micells at an early stage in the polymerization. The remainder of the polymerization is a propagation reaction wherein the size of the polymer micells is increased. Since essentially all the polymer micells are formed at essentially the same time and propagated for the same length of time, the polymer particles all fall within a narrow distribution of sizes.

The general object of this invention is to provide a process of preparing stable, high solids, low viscosity, polydisperse polyvinylidene chloride latex. Other objects appear hereinafter.

We have now found that it is possible to produce stable, high solids, low viscosity, polydisperse polyvinylidene chloride latex of relatively small particle size by initiating the polymerization of vinylidene chloride under emulsion polymerization conditions, preferably in the presence of particles of a preformed addition polymer in latex form having an average diameter less than the average diameter of the ultimate vinylidene chloride polymer, (2) adding during the vinylidene chloride polymerization (after the reaction becomes exothermic) additional particles of preformed addition polymer in latex form having an average diameter less than the average diameter of the ultimate vinylidene chloride polymer. In contrast to the typical latex polymerization processes, where essentially all the polymer micells are formed at the same time and propagated for essentially the same length of time, our process entails adding additional polymer micells to the polymerization zone at predetermined times. In this way all polymer micells are not propagated for the same length of time and a predetermined distribution of polymer particles is readily attained. Other things being equal, polymer emulsions prepared in this manner have a lower viscosity than polymer emulsions prepared without the addition of preformed addition polymer. Further, the polydisperse nature of these products seems to enhance the emulsion stability, leveling properties, resistance to moisture and to moisture vapor transmission, etc.

In the discussion that follows, the "preformed addition polymer particles in latex form" is also referred to as a "seed latex" and the polymerization process used to prepare the "seed latex" is called the "seed latex polymerization." In order to differentiate between the preparation of the "seed latex" and the preparation of the polydisperse vinylidene chloride latex, the latter process is called the "polydisperse vinylidene chloride polymerization."

The vinylidene chloride polymers of this invention are copolymers of from about 70 to 97% by weight vinylidene chloride, preferably 85 to 94% by weight vinylidene chloride. Suitable monoethylenically unsaturated comonomers suitable for copolymerization with vinylidene chloride are alkyl esters of alpha, beta-ethylenically unsaturated monocarboxylic acids containing from 1 to 18 carbon atoms in the alkyl group; such as methyl acrylate, ethyl acrylate, 2-ethylhexyl acrylate, methyl methacrylate, and ethyl alpha-cyanoacrylate, etc.; alpha, beta-ethylenically unsaturated acids, such as acrylic acid, methacrylic acid and itaconic acid; alpha, beta-ethylenically unsaturated nitriles, such as acrylonitrile, methacrylonitrile and ethacrylonitrile; alpha, beta-ethylenically unsaturated amides, such as methacrylamide and acrylamide; monovinyl aromatics, such as styrene and vinyl toluene; vinyl halides, such as vinyl chloride and vinyl bromide; diesters of alpha, beta-ethylenically unsaturated dicarboxylic acids, such as dimethyl itaconate, diethyl fumarate and dimethyl maleate; alkyl vinyl ethers, such as methyl vinyl ether and ethyl vinyl ether; alkyl vinyl ketones, such as methyl vinyl ketone, etc. If desired up to about 2% by weight of the monomers used to prepare the polydisperse polymer can be copolymerizable di (ethylenically unsaturated) comonomers, such as allyl crotonate, allyl acrylate, polyhydric alcohol esters of alpha, beta-ethylenically unsaturated monocarboxylic acids, such as 1,3-butylene dimethacrylate, the diacrylate or dimethacrylate of glycol, diethylene glycol to triethylene glycol, etc.

The minimum and maximum concentrations of vinylidene chloride that can be present in the polydisperse copolymer depends upon the ultimate use of the copolymer latex and the comonomers used to prepare the polymer. The comonomers are necessary in order to prevent premature crystallization of the polymer prior to application and in order to enhance other properties, such as adhesion to the substrate, leveling, wetting of the substrate, heat sealing properties of the dried coating. If less than about 3% by weight comonomer is present the polymer tends to crystallize prematurely. (Preferably at least about 6% by weight comonomer should be present.) However, as the concentration of vinylidene chloride in the polymer decreases, the barrier resistance of the applied coating decreases. Accordingly, the comonomers should comprise from about 3 to 30% by weight of the polymer, and preferably 6 to 15% by weight, to obtain the proper balance.

The dispersing agents or emulsifiers for use in this invention are the so called anionic and nonionic surface active agents. The anionic surface agents are preferred because they tend to yield the desired particle size polymers at lower emulsifier concentrations than can be obtained with the nonionic surface active agents. Suitable anionic surface active agents include alkali metal salts of alkyl aryl sulfonates, such as sodium dodecyl benzene sulfonate, sodium diamyl naphthalene sulfonate, disodium 4-dodecyloxydi(benzenesulfonate), etc.; alkali metal salts of alkyl sulfates, such as sodium lauryl sulfate, sodium myristyl sulfate, etc. Suitable nonionic surface active agents include the alkylphenyl polyoxyethylene glycols and alkylpolyoxyethyleneglycols containing from 4 to 18 carbon atoms in the alkyl group and from about 2 to 120 oxyethylene units. These compounds can be used in a weight concentration of about 0.1 to 6% of the total monomer weight with about 0.5 to 3% being best. The most advantageous concentration will depend, as in all emulsion polymerizations, in part on the emulsifier or emulsifiers used, the monomers to be polymerized, the desired particle size, the initiator system, etc.

As polymerization catalysts, there may be used one or more of the peroxidic compounds known to act as free radical catalysts. The catalyst can be soluble in aqueous solutions of the emulsifier or soluble only in the monomer phase, or both. Among the useful catalysts for the present type of copolymerization are inorganic peroxides, organic peroxides and hydroperoxides. These include hydrogen peroxide, benzoyl peroxide, tertiary butyl hydroperoxide, diisopropyl benzene hydroperoxide, cumene hydroperoxide, caproyl peroxide, methylethyl ketone peroxide, etc. Other free-radical catalysts are also useful, such as azodiisobutyronitrile and other aliphatic azo compounds of the type having an acylic azo group and an aliphatic carbon atom on each nitrogen, at least one of which is tertiary. In part, the particular combination of monomers governs the selection of the catalysts since some monomers respond better to one variety than they do to another.

The amount of peroxidic catalysts required is about proportional to the concentration of monomers used. The usual range is 0.01% to 3% of catalysts with reference to the weight of the monomer mixture. The preferred range is about 0.10 to 1.0% while the range of 0.1–0.4% is usually best. The optimum amount of catalysts is determined in large part by the nature of the particular monomers selected, including impurities which accompany particular monomers. In general, it is preferred to use the lowest concentration of catalyst sufficient to give the desired rate of conversion since the higher the catalyst concentration the lower the polymer's molecular weight and the poorer its barrier properties.

Frequently, a promoter for the catalysts is used to hasten the reaction at a sufficiently low temperature to avoid coagulation. The promotor may be a reducing agent and the combination with the peroxidic catalyst is frequently referred to as a "redox system". Many examples of such systems are known and the promoters include ascorbic acid, and soluble sulfites, hydrosulfites, sulfoxalates, thiosulfates, and bisulfites. Particular promoters are exemplified by sodium hydrosulfite, sodium metabisulfites, zinc or sodium formaldehyde sulfoxalate, and calcium bisulfite. Polyvalent metal ions are also used in small concentrations, particularly ferrous ion in the form of ferrous ammonium sulfate at concentrations of a few parts of ferrous ion per million.

The amount of promoter required varies, as is known, with the free-radical initiator chosen and with a particular promoter. The emulsifying agent also affects somewhat the amount of catalyst used as does the particular monomers. At the outside, not more than 3% or less than 0.01% of promoter is used in these situations. The preferred range of ascorbic acid is at the low end of this range up to about 0.1% while sulfites are used preferably in an amount of 0.1% to 1%.

The preformed latex polymer particles (seed latex) used in this invention can be prepared from monomers containing at least one methylene group attached to a carbon atom by a double bond which undergo addition polymerization in aqueous dispersion to form high molecular weight linear polymers. The most important class of such materials consists of monomers containing a single olefinic double bond present in a $CH_2=C<$ group, in which at least one of the free valences is bound to an electronegative group, that is, a group which increases substantially the polar characteristics of the molecule. Suitable moroethylenically unsaturated monomers include monovinyl aromatics, such as styrene, p-vinyl toluene, p-chlorostyrene; alpha, beta-ethylenically unsaturated acids, such as acrylic acid and methylacrylic acid; alkyl esters of alpha, beta-ethylenically unsaturated monocarboxylic acids, containing from 1 to 18 carbon atoms in the alkyl group, such as methyl acrylate, ethyl acrylate, 2-ethylhexyl acrylate and methyl methacrylate; alpha, beta-ethylenically unsaturated nitriles such as acrylonitrile and methacrylonitrile; alpha, beta-ethylenically unsaturated amides, such as acrylamide and methacrylamide; vinyl esters, such as vinyl acetate and vinyl propionate; vinyl halides, such as vinyl chloride and vinyl bromide; vinyl ethers, such as vinyl methyl ether and vinyl ethyl ether; vinyl ketones, such as vinyl methyl ketone and vinyl ethyl ketone; vinylidene halides, such as vinylidene chloride and vinylidene bromide, etc. The seed latex can be a homopolymer or copolymer of two or more of these monomers. If desired up to above 5% by weight of the monomers can be copolymerizable diethylenically unsaturated monomers, such as allyl crotonate, allyl acrylate, polyhydric alcohol esters of alpha, beta-ethylenically unsaturated carboxylic acids, such as 1,3-butylene dimethacrylate, diethyleneglycol or triethylene glycol diacrylate or dimethacrylate, etc.

In general, it is preferred that the seed latex particles be prepared from a monomer blend containing 50 to 95% by weight vinylidene chloride. In this way, it is possible to use the same emulsifiers and catalysts to prepare both the product polydisperse vinylidene chloride polymer latex and the preformed polymer latex. In some cases, it is desirable to prepare the preformed polymer latex particles with the same monomer composition as that of the final composition, the polydisperse polyvinylidene chloride polymer latex.

The preformed latex polymer particles can be prepared by any emulsion polymerization reaction either of a batch or of a continuous monomer addition type. The dispersing agents and catalysts for use in the preparation of the preformed latex polymer particles can be any of those normally used in the emulsion polymer art, such as those described above. Preferably the dispersing agents and catalysts are the same as those used in the preparation of the polydisperse vinylidene chloride latex.

As indicated above, the preformed latex polymer particles can be and preferably are present in the reactor when the polydisperse polymerization of this invention is initiated. The seed latex reduces the polymerization induction period and lessens any tendency of the latex to coagulate (i.e. permits the initiation of polymerization with lower concentrations of emulsifier). In such cases, it is desirable that the same preformed latex polymer particles (seed latex) be used throughout the process to assure the desired particle size distribution in the final latex. If desired, the seed latex can be prepared separately with part of the same seed latex being used throughout the production of one or more polydisperse vinylidene chloride latexes. In other cases, it may be desirable to use one reactor for the preparation of both the seed latex particles and the polydisperse vinylidene chloride latex. In these cases, it is convenient to polymerize a small proportion (1–30%) of the total monomers to be used to form the polydisperse vinylidene chloride latex in the reactor, bringing the polymerization to completion to produce the seed latex. After the seed latex polymerization, a portion of the seed latex is withdrawn from the reactor for subsequent addition to the polydisperse vinylidene chloride polymerization reaction.

While the method of preparing the preformed latex addition polymer particles is not critical, the polymer particles should have an average particle size in the range of about 0.01 to 0.12 microns depending upon the ultimate size distribution desired in the polydisperse polyvinylidene chloride latex, best results being obtained with particles in the range of about 0.01 to 0.05 microns.

The seed latex can be used in a concentration of about 0.5 to 30% by weight of all monomers used to form the seed latex and the polydisperse vinylidene chloride latex, with at least the minimum concentration of seed latex (0.5% by weight) being added to the polydisperse polymerization zone after the polydisperse polymerization has been initiated. Best results have been obtained when seed latex comprises about 1 to 5% of the total weight of monomers in the final product and between 50 to 90% of the weight of the seed latex is added after the polydisperse polymerization becomes exothermic.

As indicated above, the polydisperse vinylidene chloride polymerization process of this invention comprises placing all or part of the monomers to be polymerized in a reactor, initiating the polymerization and, after the reaction is initiated, adding preformed addition polymer in latex form having an average diameter less than the average diameter of the ultimate polydisperse polyvinylidene chloride polymer. The addition can be at predetermined intervals or continuously.

Polymerization is best effected below about 95° C. The preferred range is about 30° to 70° C. with the bottom portion of the range (30–45° C.) being preferred to initiate the polymerization. Slightly lower temperatures, down to 0° C., are permissible. After most of the monomers have been converted to polymer, temperatures even higher than 95° C. may be employed. During polymerization the temperature can be controlled in part by the rate at which monomers are supplied and polymerized and/or by applied cooling.

The polymerization can be carried out batchwise, except for the addition of the seed latex, or it can be characterized by continuous addition of one or more other components employed in the polymerization. In its simplest form, this invention entails emulsifying the entire charge of monomers, initiating the polymerization reaction and subsequently adding seed latex to the polymerization zone, either continuously or periodically at predetermined intervals and predetermined amounts. It is usually advantageous, however, to start with part of the monomers to be polymerized and add more monomer or monomers as polymerization proceeds. An advantage of gradual addition of monomers (either continuous or periodic) lies in reaching a high solids content with optimum control of reaction conditions. Amounts of catalyst or of a component of a redox system catalyst may be added as the polymerization proceeds, and these can be used to control the speed of reaction to avoid overheating.

In those cases where gradual or delayed addition of monomer is employed, it is also desirable to use part or all of the emulsifier to emulsify the monomers prior to their addition to the polymerization zone. We have found that adding monomer in emulsified form is effective in reducing the time necessary for the production of vinylidene chloride latex. Production times have been reduced by about 30 to 40% in this manner both with and without the use of seed latex for particle size control, and we prefer to use this mode of addition.

It is also advantageous, hence preferred, when employing continuous or delayed monomer addition, to mix the monomer to be polymerized with the seed latex and add these in one stream. In addition to the purely operational advantage implicit in employing a single stream of reactants, this assures that the reaction is replenished with a composition having essentially the same proportion of seed latex particles and unreacted monomers at each addition. The delayed addition of both monomer and preformed polymer in this manner makes it possible to carefully control the rate of polymerization, and the distribution and size of particles and to obtain a high solids, low viscosity latex. In this manner, with the preferred seed latexes having an average diameter of about 0.01 to 0.05, we have consistently formed high-solids, low-viscosity latexes having 95% to 100% by weight of the particles falling within a particle size distribution of (A) from about 0.02 to 0.14 microns in small reactors and (B) from about 0.02 to 0.18 microns in large reactors.

The preferred method of polydisperse vinylidene chloride polymerization comprises the steps of (1) initiating the polymerization of vinylidene chloride in the presence of a preformed addition polymer in latex form having an average diameter less than the average diameter of the ultimate polydisperse vinylidene chloride polymer, (2) adding additional vinylidene chloride, preferably emulsified, at a predetermined rate and polymerizing said vinylidene chloride, (3) during step (2), adding, preferably as a single stream containing emulsified vinylidene chloride monomer, additional particles of preformed addition polymer in latex form, the additional particles having an average diameter less than the average diameter of the ultimate vinylidene chloride polymer and (4) terminating said polymerization at a predetermined solids content, usually in the range of about 50 to 75% solids, preferably 55 to 65% solids.

A convenient method of carrying out the preferred polydisperse vinylidene chloride polymerization comprises preparing separate premixtures as follows: (I) an emulsifier-monomer premixture containing from about 50 to 90% of the weight of the seed latex to be employed (at least 0.5 parts by weight per 100 parts by weight of the total of monomer and seed latex), (II) a seed-latex premixture containing from 10 to 50% of the weight of the seed latex to be used and the free-radical catalyst. In this method of operation, the seed-latex premixture (containing free-radical catalyst) is first added to the reaction vessel with from about 1 to 20% by weight of the emulsifier-monomer premixture. The polymerization is initiated at a temperature of about 30 to 45° C. After the reaction becomes exothermic, the remainder of the monomer premixture is added over a time sufficient to permit the temperature to be controlled throughout the reaction. Additional catalyst and/or promoter is added when necessary to maintain the reaction. When the latex reaches the desired solids level (50-75%), the reaction is permitted or forced to go to completion, which is insured by raising the reaction temperature and/or by the addition of additional catalyst and/or promoter. The emulsion can then be poststabilized, if desired, with additional emulsifier, as is conventional.

The following examples are merely illustrative and should not be construed as limiting the scope of the invention.

Example I

The following premixtures were prepared to be used in the preparation of a preferred polydisperse polyvinylidene chloride latex:

| | Parts (wet wt.) |
|---|---|
| Emulsifier-Monomer Premixture: | |
| Vinylidene chloride | 2,094.5 |
| Methyl acrylate | 195.6 |
| Acrylic acid | 11.5 |
| 1,3-Butylene dimethacrylate | 11.5 |
| Seed latex (20% dry solids) | 230.2 |
| Sodium dodecylbenzene sulfonate (23% dry dry solids) | 167.8 |
| Sodium lauryl sulfate (29% dry solids) | 23.1 |
| Disodium monodecylphenoxybenzenedisulfonate (45% dry solids basis) | 14.9 |
| Water | 302.5 |
| Reactor Charge: | |
| $NaH_2PO_4 \cdot H_2O$ | 6.0 |
| Citric acid $\cdot H_2O$ | 0.46 |
| Water | 312.9 |
| Seed latex (20% dry solids) | 109.8 |
| 2% by weight $H_2O_2$ | 100.0 |
| Vinylidene chloride | 89.5 |
| Methyl acrylate | 8.4 |
| Acrylic acid | 0.5 |
| 1,3-Butylene dimethacrylate | 0.5 |
| Sodium dodecylbenzene sulfonate (23% dry solids) | 7.2 |
| Sodium lauryl sulfate (29% dry solids) | 1.0 |
| Disodium monodecylphenoxybenzenedisulfonate (45% dry solids) | 0.6 |
| Promoter: | |
| Ascorbic acid (0.8% dry solids) | 300.0 |
| Additional Catalyst: | |
| 2% by weight hydrogen peroxide | 120 |

A water-cooled stainless steel reactor was charged with the above described charge. After the temperature was adjusted to 30° C., promoter was added to the reactor at a rate of about one-half part per minute. After about 15 minutes, the addition of emulsifier-monomer premixture was started at a rate of about one-half part per minute. The temperature was maintained at between about 35-45° C. by cooling and adjusting the rate of addition of the monomer-emulsifier premixture, promoter and additional catalyst. After, the monomer-emulsifier premixture addition was complete (about four hours), the reaction temperature was raised to 70° C. to complete the polymerization. The cooled 60% solids composition was poststabilized with 35 parts by weight of sodium dodecylbenzene sulfonate (23% dry solids) and had a Brookfield viscosity at 77° F. (Model RUT 20 rpm, Spindel #2) of 34 cps. Electron microscopy showed that the latex contained a significant number of particles over the range of about 0.02 to 0.13 microns.

The seed latex used in this example, which contained particles principally in the range of 0.01 to 0.05 microns was prepared by charging a water-cooled stainless steel reactor with 0.2 parts by weight $NaH_2PO_4 \cdot H_2O$, 640 parts by weight water, 20 parts by weight 2% $H_2O_2$ and 60 parts by weight of an emulsifier composition composed of 56.0 parts by weight of sodium dodecylbenzenesulfonate (23% dry solids), 5.5 parts by weight sodium lauryl sulfate (29% dry solids), 3.5 parts by weight disodium monodecylphenoxybenzenedisulfonate (45% dry solids) and 15 parts by weight water. After the tempreature was adjusted to 35° C., 280 parts by weight of an emulsified monomer composition containing 180 parts by weight vinylidene chloride, 18 parts by weight methyl acrylate, 2 parts by weight methacrylic acid and the remaining 20 parts by weight of the above described emulsifier composition was added to the reactor at the rate of about 3 parts by weight per minute. At the same time 40 parts by weight of ascorbic acid (0.8% by weight dry solids) was added over a period of about 2 hours while maintaining the reactor at between 35 to 45° C.

Example II

Example I was repeated except that the concentration of seed latex was cut in half. The final 60% solids latex had essentially the same particle size distribution (0.02 to 0.13 microns) as the latex of Example I and a viscosity of 50 cps.

Example III

This example illustrates that a polydisperse polyvinylidene chloride latex is not formed, if a seed latex is not added after the monomer polymerization is initiated. When Example I was repeated except that no seed latex was employed, the resulting 60% solids polymer latex had a particle size distribution of 0.10 to 0.12 microns and a viscosity of 64 cps. When Example I was repeated except that no seed latex was employed in the monomer-emulsifier feed (seed latex was included in the reactor charge), the resulting 60% solids polymer latex had a particle size distribution of 0.11 to 0.14 microns and a viscosity of 68 cps.

Example IV

This example illustrates the preparation of a polydisperse vinylidene chloride latex using a nonionic-anionic emulsifier system and incremental addition of preformed addition polymer in latex form. A glass reactor was charged with 1.2 grams sodium acetate, 0.1 ml. acetic acid, 10 ml. of 2% $H_2O_2$, 55 ml. water and 2 ml. of an emulsifier composition composed of 5 ml. Brig 35 (20% dry solids), 30 ml. Igepal CO-880 (20% dry solids), 8 ml. Igepal CO-850 (20% dry solids), 20 ml. sodium lauryl sulfate (20% dry solids) and 50 ml. water. After the reactor was adjusted to 35° C., 480 ml. of emulsified monomer-catalyst composition consisting of 108 ml. of the above described emulsifier composition, 357 grams vinylidene chloride, 37 grams methyl acrylate, 3.4 grams acrylamide, 2 ml. acrylic acid and 25 ml. of 2% by weight $H_2O_2$ was added to the reactor at the rate of about 120 ml. per hour. Simultaneously 55 ml. of 0.8% by weight ascorbic acid was added to the reactor at a rate of about 9 ml. per hour while maintaining the reaction at about 37 to 42° C. About one-half hour after the addition of monomer was started (60 ml. of monomer composition added to the reactor), 80 ml. of latex was withdrawn from the reactor. The withdrawn latex was added back to the reactor in 20 ml. increments when (A) there was still 300 ml. of monomer-emulsifier composition to be added to the reactor, (B) there was 225 ml. of monomer-emulsifier composition to be added, (C) there was 150 ml. of monomer-emulsifier composition to be added and (D) there was 75 ml. of monomer-emulsifier composition to be added. After the emulsifier-monomer addition was complete 5 grams of methyl acrylate and an additional 5 ml. of 2% by weight $H_2O_2$ was added to the reactor, which was maintained at about 40–43° C. for one hour. The temperature was raised to 70° C. to complete the polymerization.

The resultant 60% solids latex had a viscosity of 150 cps. and had a particle size range of about 0.02 to 0.17 micron distributed principally in three particle groups of 0.02 to 0.05 micron, 0.07 to 0.11 micron and 0.17 micron.

When this example was repeated except that no latex was withdrawn from the reactor and added back, a monodisperse polyvinylidene chloride latex having essentially all its particles in the range of 0.13 to 0.16 micron was formed. The 60% solids latex had a viscosity of 1,500 cps.

Since many embodiments of this invention may be made and since many changes may be made in the embodiments described, the foregoing is to be interpreted as illustrative only, and our invention is defined by the claims appended hereafter.

We claim:
1. In a process of preparing a stable, high solids, low viscosity, polydisperse polyvinylidene chloride latex which comprises polymerizing a monomer composition comprising 70 to 97% by weight vinylidene chloride, the steps comprising initiating the polymerization of monomer under emulsion polymerization conditions and, after the polymerization becomes exothermic, adding monomer and particles of preformed addition polymer in latex form, the added particles having an average diameter less than the average diameter of the ultimate polydisperse vinylidene chloride polymer, said added particles comprising at least 0.5% of the total weight of the monomers present in said polydisperse polyvinylidene chloride latex.

2. The process of claim 1, wherein said vinylidene chloride polymerization is initiated in the presence of particles of said preformed addition polymer.

3. The process of claim 2, wherein said preformed addition polymer comprises up to 30% of the total weight of monomers present in said polydisperse polyvinylidene chloride latex.

4. The process of claim 1, wherein said preformed addition polymer has an average diameter in the range of 0.01 to 0.05 microns inclusive.

5. In a process of preparing a stable, high solids, low viscosity, polydisperse polyvinylidene chloride latex, which comprises polymerizing a monomer composition comprising about 70 to 97% by weight vinylidene chloride, the steps comprising (1) initiating the polymerization of from about 1 to 20% by weight of the monomer composition to be polymerized under emulsion polymerization conditions in the presence of particles of preformed addition polymer in latex form having an average diameter less than the average diameter of the desired polydisperse polyvinylidene chloride polymer, (2) adding additional monomer at a predetermined rate and polymerizing said monomer, (3) during step (2), adding particles of preformed addition polymer in latex form having an average diameter less than the average diameter of said polydisperse polyvinylidene chloride polymer and (4) terminating the polymerization at a predetermined solids content in the range of about 50 to 75% by weight polymer solids, said preformed particles added during step (2) comprising at least 0.5% of the total weight of monomers used in the process and said preformed addition polymer particles used in steps 1 and 2 comprise 1 to 30% of the total weight of monomers used in said polydisperse polyvinylidene chloride latex.

6. The process of claim 5, wherein said preformed addition polymer contains at least 50% by weight vinylidene chloride.

7. The process of claim 6, wherein said particles of preformed addition polymer comprise from about 1 to 5% of the total weight of monomers used in said polydisperse polyvinylidene chloride latex and wherein from 50 to 90% by weight of said preformed addition polymer is added during step (2).

8. The process of claim 7, wherein said monomer is added in step (2) in emulsified form.

9. The process of claim 7, wherein said monomer added in step (2) and said preformed particles added in step (3) are added together as a single stream.

10. The process of claim 7, wherein said particles of preformed addition polymer in latex form has an average diameter in the range of 0.01 to 0.05 micron inclusive.

References Cited

UNITED STATES PATENTS

| | | |
|---|---|---|
| 2,894,927 | 7/1959 | Elder et al. |
| 2,909,449 | 10/1959 | Banigan. |
| 3,291,768 | 12/1966 | Pfluger et al. |

MURRAY TILLMAN, *Primary Examiner.*

J. W. SNOW, *Asisstant Examiner.*

U.S. Cl. X.R.

260—87.7, 898, 899; 117—127, 138.8, 152, 161